July 30, 1963  R. P. BIGLIANO  3,099,262
PHYSIOLOGIC FLUID PRESSURE SENSING HEAD
Filed June 21, 1962  3 Sheets-Sheet 1

INVENTOR
ROBERT P. BIGLIANO
BY Harry J. McCauley
ATTORNEY

July 30, 1963   R. P. BIGLIANO   3,099,262
PHYSIOLOGIC FLUID PRESSURE SENSING HEAD
Filed June 21, 1962   3 Sheets-Sheet 3

INVENTOR
ROBERT P. BIGLIANO

BY  *Harry J. McCauley*

ATTORNEY

United States Patent Office 3,099,262
Patented July 30, 1963

3,099,262
PHYSIOLOGIC FLUID PRESSURE SENSING HEAD
Robert P. Bigliano, Wilmington, Del., assignor to E. I. du Pont de Nemours and Company, Wilmington, Del., a corporation of Delaware
Filed June 21, 1962, Ser. No. 204,244
5 Claims. (Cl. 128—2.05)

This invention relates to a physiologic fluid pressure sensing head, and particularly to a sensing head adapted to measure the existing pressures of body fluids, such as blood pressure and the like, through the walls of elastic body membranes. This application is a continuation-in-part of U.S. application S.N. 143,124 filed October 5, 1961.

There is a very great need for reliable and convenient apparatus to measure blood pressures, both venous and arterial, as well as other physiologic body fluid pressures, such as those accompanying the existence of glaucoma eye disease, and the like, for use on both human beings and test animals. Such apparatus is required not only in the swiftly growing fields of medical research but also as an aid in day-to-day medical treatment.

In my parent application hereinbefore identified, there was disclosed a dual head sensing device which eliminates the error-introducing, co-existing compressive effect of body tissue surrounding a blood vessel during blood pressure measurements. That apparatus utilized counterbalancing sensing heads for body tissue and blood vessel, respectively.

I have now devised a single head sensor which is capable of physiologic fluid pressure measurements of extremely high accuracy, and this is the subject matter of this application.

Figure 1:
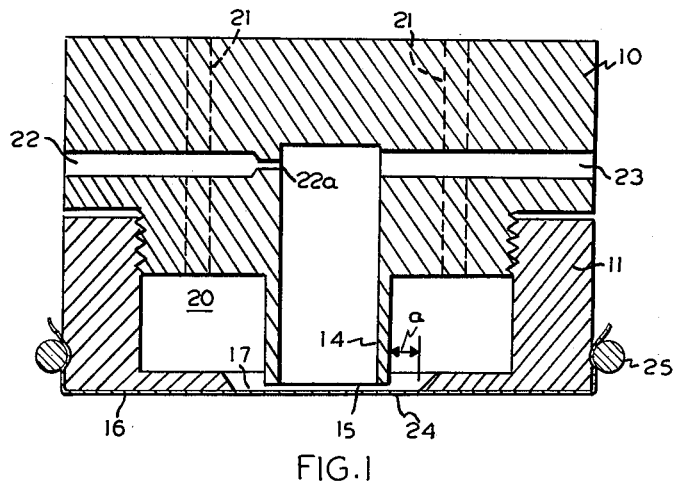
Figure 4:
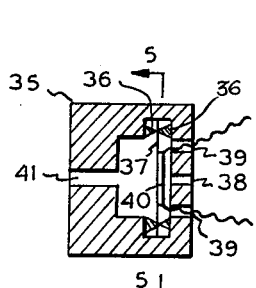
Figure 2:
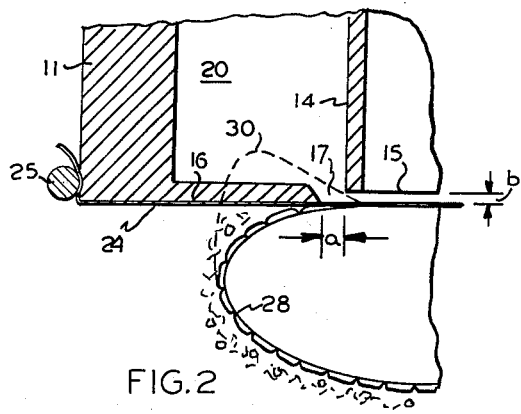
Figure 6:
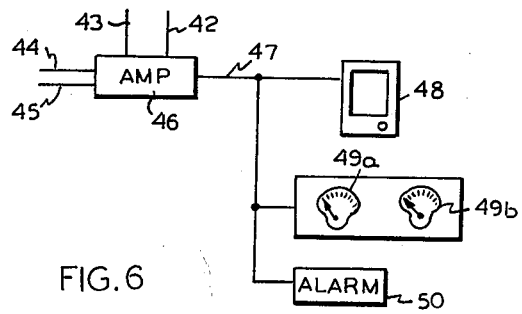
Figure 5:
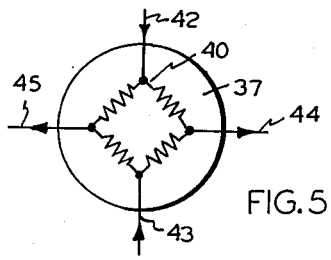
Figure 3:
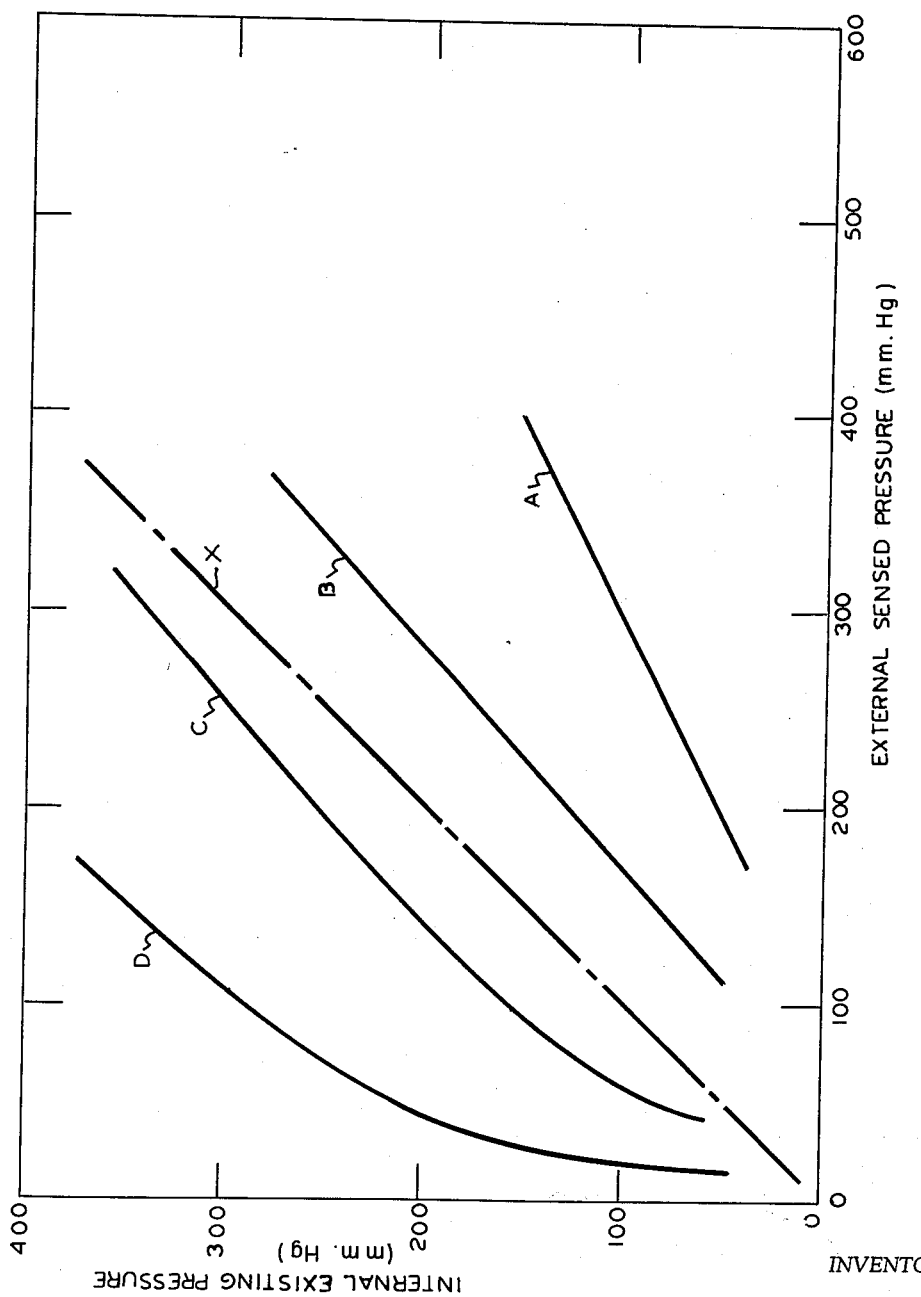
Figure 7:
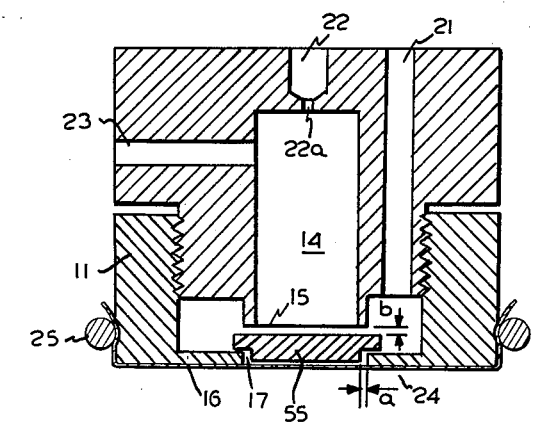
Figure 7A:
Figure 7B:
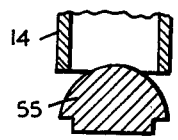
Figure 8:
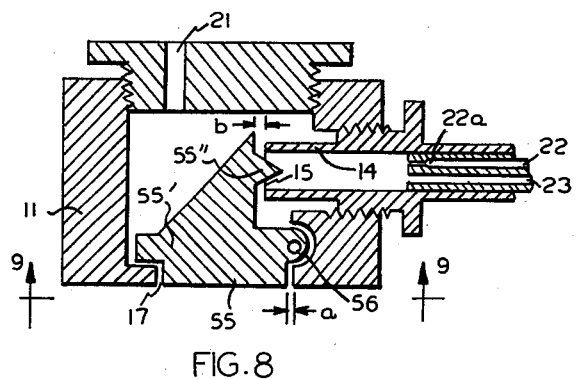
Figure 7C:
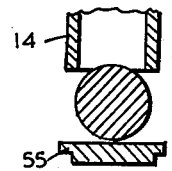
Figure 7D:
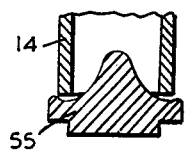
Figure 9:
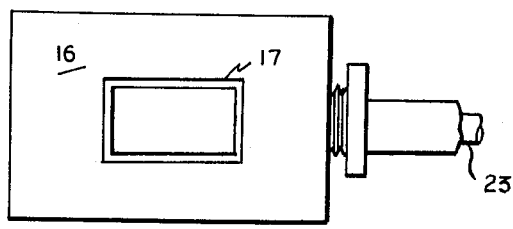

An object of this invention is to provide a single-head physiologic fluid pressure sensor and one which is very compact and small in mass, simple in design, cheap in first cost and maintenance and so rugged as to permit its use under severe conditions, such as during space flights and in the course of similar activities. Other objects of this invention include the provision of a physiologic fluid pressure sensing head which is relatively comfortable to the patient or test subject, convenient to use, and one which either requires no calibration or, alternatively, is very readily calibrated. The manner in which these and other objects of this invention are attained will become clear from the following detailed description, and the drawings, in which:

FIG. 1 is a side-elevational cross-sectional view of a preferred embodiment of sensing head according to this invention, FIG. 2 is an enlarged fragmentary view of a portion of the head of FIG. 1 shown in application to an exposed artery for the purpose of measuring blood pressure therein, FIG. 3 is a plot of external sensed pressure v. internal existing pressure as applied to a section of a dog's femoral artery subjected to pulsating liquid flow in simulation of blood flow for sensing heads of the design of FIG. 1, showing the effects of different recess dispositions of gas pressure development nozzle discharge openings with respect to the blood vessel-depressing faces, FIG. 4 is a longitudinal cross-section through a transducer auxiliary adapted for use in conjunction with the sensing head of FIG. 1, FIG. 5 is a full section on line 5—5, FIG. 4, with diaphragm clamp rings omitted, showing the mounting of the strain gage bridge with respect to the transducer diaphragm, FIG. 6 is a block diagram showing details of the electrical supply and associated meter circuitry for the complete physiologic fluid pressure measuring apparatus of this invention, FIG. 7 is a side-elevational cross-sectional view of a second embodiment of apparatus according to this invention, FIGS. 7a–7d, inclusive, are detail schematic views of representative alternate designs of rigid pressure-responsive intermediary structures throttling air flow through gas pressure development nozzles responsive to the transient level of physiologic pressure which it is desired to measure, these being adapted to employment with the embodiment of FIG. 7, FIG. 8 is a side-elevational cross-sectional view of a third embodiment of apparatus according to this invention provided with an offset gas pressure development nozzle, and FIG. 9 is a full view of the elastic membrane depressing face of the apparatus of FIG. 8 as seen from line 9—9 thereof.

Generally, the pressure sensing head of this invention adapted to the measurement of physiologic fluid pressure existing behind an elastic body membrane comprises, in combination, a rigid apertured elastic body membrane depressor element provided with an elastic body membrane-depressing face having a surface generally conforming to that of the undepressed flesh to which the depressor element is to be applied, and a gas pressure development nozzle fixedly mounted with respect to the depressor element with discharge opening disposed on the rear side of the depressor element from the elastic body membrane-depressing face in a location preserving throttled gas flow out of the discharge opening responsive to the physiologic fluid pressure but clear of contact with the elastic body membrane and any flesh overlying the elastic body membrane, as well as any elastomeric diaphragm closing off the aperture in the depressor element and any freely movable rigid structure interposed between the discharge opening and the elastic body membrane together with any flesh overlying the elastic body membrane, during the time the depressor element is made to depress the elastic body membrane without occlusion of passage of physiologic fluid therepast, the gas pressure development nozzle being provided with a first port for introduction therein of gas under pressure at substantially fixed flow rate and a second port for measurement of the gas pressure developed within the nozzle, whereupon the gas pressure developed within the nozzle is a function of the physiologic fluid pressure existing behind the elastic body membrane.

Referring to FIG. 1, a preferred embodiment of this invention intended for blood pressure measurement consists of a generally two-part construction having a main member 10 adapted to receive in threaded engagement therewith a flat-faced elastic body membrane depressor element 11. Both of these components are made of rigid corrosion-resistant material, such as an acetal polymer, stainless steel or the like, and, since they can be made in very small sizes, as will be hereinafter described, the mass of the material of fabrication employed is of little consequence.

Member 10 is provided with an integral depending, thin-walled, circular cross-section, gas pressure development nozzle 14 with discharge opening 15 substantially coparallel with the elastic body membrane depressing face 16 of depressor element 11, but recessed therefrom a small distance, typically 0.0010", as hereinafter described. A sharp-edged circular aperture 17, cut on an inside bevel, is provided in the face of depressor element 11 concentric with discharge opening 15, and the inside region of 11 is enlarged annularly at 20 to provide exhaust space for receiving gas escaping from nozzle 14 via opening 15. This gas is vented to atmosphere through two or more vents 21. The assembly is completed by a gas supply port 22 provided with a restriction 22a (typically 0.0065" dia. with 25 p.s.i.g. air supply) preserving fixed flow rate delivery of gas into nozzle 14, and a second nozzle port 23 for measurement of the gas pressure developed within the nozzle through the agency of the transducer of FIGS. 4 and 5.

For sanitary reasons, it is preferred to mask the elastic body-membrane contacting face of depressor element 11 and also aperture 17 with a taut, but essentially unstretched, thin dam rubber diaphragm 24, secured in place by ring clamp 25; however, this can be dispensed with if desired, as shown for the embodiment of FIGS. 8 and 9.

The operation of the apparatus of FIG. 1 will be explained with particular reference to FIG. 2 which shows, schematically, the employment of the device in blood pressure measurement by direct application to an exposed artery wall (for example, the radial artery of the human wrist), in accordance with one particular technique utilized for blood pressure observational studies made over extended periods of time on both human beings and test animals. In such a use, aperture 17 is made with a diameter substantially less than the projected limits of the blood vessel 28 in test, which can typically be either an artery or a vein. If the blood vessel is depressed to approximately the same degree in successive observations, as, for example, to about one-fourth of its free state circular diameter, it will be seen that the flat face 16 of depressor element 11 maintains the exposed vessel wall in a substantially common limiting horizontal plane, so that gas escape from nozzle 14 is throttled evenly through the peripheral clearance 29 defined by recess setback $b$ provided at discharge opening 15, whereupon the gas pressure developed within nozzle 14 constitutes a measure of the transient level of blood pressure existing within vessel 28.

The constraining effect of depressor element 11 on the elastic blood vessel wall is evident from broken-line trace 30, which shows the position which that wall normally assumes in the absence of any constraint applied thereto. Obviously, in the unconstrained case, the throttling of gas escape from nozzle 14 is greatly dependent on the extent of blood vessel wall intrusion into aperture 17 and, thus, cannot be a true measure of the body fluid pressure under investigation. The intrusion of vessel 28 along the line 30 is, of course, largely due to the concomitant compressive stress of surrounding body tissue on the elastic body membrane in study when the investigatory instrument is clamped tightly on the body structure. When tissue constraint is evenly provided immediately adjacent to the test site by depressor element 11, this interference to body fluid pressure measurement is cured entirely, making it unnecessary to resort to a dual head sensing design with counterbalanced pressure compensation by vessel and neighboring body tissue as described in my parent patent application hereinbefore referred to.

Two critical dimensions are applicable to the single sensing head apparatus of this invention, although the relationship between the two has not been elaborated, because it seems to be at least partly due to the elasticity of body tissue existing in a given case. These critical dimensions consist of the extent of recessing, $b$ (FIG. 2), of nozzle discharge opening 15 with respect to face 16, and the width of the annular space $a$ (FIG. 1) measured from the outwardly projected peripheral limit of nozzle 14 and the periphery of aperture 17. The most critical of these dimensions is the extent of recessing $b$, pressure measurements obtainable with various degrees of recessing being plotted for comparative purposes in FIG. 3.

It was desirable to obtain wide range pressure data, such as that plotted in FIG. 3, independent of the limitations existing within an individual physiological system, and this was accomplished by, in effect, simulating a dog's circulatory system by employing a closed length of a dog's femoral artery about 2″ long x 3/16″ dia., filling it with blood or saline solution, and subjecting it to rhythmic fluid pressure imposition (rate 120 pulses/min.) by connection with a bellows pump provided with an adjustable-stroke crank arm, whereby any predetermined pressure application within a range including all reasonable variations of animal blood pressure could be readily obtained.

Referring to FIG. 3, the effect of various degrees of recessing are evident for a design wherein the annular width $a$ was 0.005″ and the recessing $b$ was (1) A —0.0005″ (where the minus sign indicates that the discharge end of nozzle 14 protruded outward of the plane of face 16), (2) B 0.0004″, (3) C 0.0015″, and (4) D 0.0023″. The air pressure applied to gas supply port 22, provided with a metering restriction 22$a$ measuring 0.0065″ dia., was 25 p.s.i.g. Thus, in going from condition A to condition D it is seen that the external pressure developed in the apparatus, i.e., the abscissa, decreases progressively for given internal pressures, passing through the optimum condition for measurement represented by the 45° slope broken line X, at which no calibration of the apparatus is required, because the internal pressure then exactly equals the external pressure. By interpolation between lines B and C it will be seen that the optimum condition will be achieved when the recessing $b$ is about 0.0010″ for this nozzle configuration.

FIG. 3 reveals another characteristic of the apparatus of this invention, in that the sensed (external) pressure and the blood (internal) pressure vary nearly linearly over at least the pressure ranges of most interest from the blood pressure measurement standpoint, and particularly in the region adjacent optimum operational line X. This circumstance is, of course, also advantageous in eliminating the need for calibration.

Thus, it will be seen that no calibration whatever is required if the operating characteristic lies along line X, whereas simple two-point calibration is all that is required for both A and B operation, and also for operation over most of the length of C. Operation along D requires more extensive calibration, because of its generally curved shape; however, it is, of course, entirely practicable to operate along any of the four off-X characteristics, or indeed any others in between, subject to the inconvenience of calibration.

The annular dimension $a$ of 0.005″ settled upon for the design tested in FIG. 3 appears to be near optimum for the size apparatus employed, which had the following dimensions: nozzle 14—length 0.125″, inside diameter 0.062″, wall thickness 0.005″; depressor element 11—diameter 0.3125″, outside diameter space 20 0.25″, preset height space 20 0.050″; over-all height of sensing head with components 10 and 11 assembled as shown in FIG. 1 0.325″. Diaphragm 16 was, in this instance, made up as two separate diaphragms, each 0.004″ thick and overlying one another, decoupled against interference from sympathetic vibrations by interposition of a thin layer of a soft grease (e.g., Apeizon) therebetween. A similar apparatus provided, however, with an annular dimension $a$ of 0.015″, and having a recess $b$ of 0.0016″, as compared with plot C of FIG. 3 having a 0.0015″ recess $b$, had a characteristic located well below optimum X, lying close to the position of B, FIG. 3, but of noticeably decreased slope compared with the latter, so that the extent of departure from X was greater in this respect, although the operational line was very straight. Accordingly, except for some slight inconvenience in calibrating apparatus constructed with rather widely different combinations of dimensions $a$ and $b$, it will be clear that perfectly operable sensing heads are obtained, which can be used singly without the necessity for compensation by counter-balancing against an adjacent body tissue compression sensor.

The developed pressure within nozzle 14, which corresponds to the body fluid pressure of interest, can be measured in various conventional ways. One such way is to employ a pressure-to-electrical signal transducer, such as that detailed in FIGS. 4 and 5, which is simply a closed chamber 35 within which is clamped, as between V-rings 36, a thin (typically, 5-mil thick beryllium-copper alloy plate, circular in shape, 0.6" dia.) diaphragm 37. Diaphragm 37 is provided on its outboard side, which is vented to the atmosphere via port 38 and the electrical lead conduits 39, with a strain-gage bridge, indicated generally at 40, FIG. 5, adhered thereto. A satisfactory bridge is one utilizing four SR-4 spiral element strain gages of nominally 120 ohm resistance size. Thus, when gas pressure sensing port 23 is connected via a leak-tight small bore conduit (not shown) to the closed side port 41 of the transducer of FIGS. 4 and 5, diaphragm 37 is deflected and the strain-gage bridge measures the pressure developed within nozzle 14, corresponding to the body fluid pressure sought. In a typical apparatus wherein a 5-ft. long polymeric tube (0.030" i.d. x 0.90" o.d.) was employed to connect the sensing head with the transducer, it was found that less than 2% of signal amplitude loss occurred, even at this relatively remote mounting of components with respect to one another.

An indicating circuit arrangement which has proved to be satisfactory in service is the more or less conventional one shown in FIG. 6, which utilizes a carrier amplifier 46 for A.C. operation of bridge 40. Amplifier 46 connects with bridge 40 via power supply leads 42 and 43, and receives the output signal from the bridge via leads 44 and 45. The output signal from the amplifier can be transmitted via lead 47 at will to either, or both, conventional recording meter 48 or to individual systolic or diastolic pressure indication meters 49a and 49b. Also, in some uses it is desirable to employ limit switch-actuated alarm facilities 50 (not detailed), which signal the attendant audibly, or by characteristic lamp illumination, that the blood pressure in evaluation exceeds preselected high and low limits.

The apparatus hereinbefore described in detail was utilized to record the arterial blood pressure of anesthetized dogs, wherein the sensing head was applied directly to the exposed femoral artery wall, and operation compared with an implanted pressure-measuring catheter apparatus installed in the immediate vicinity within the same blood vessel. Except for slightly different average measured mean blood pressures, ascribable to small dimensional differences in the measurement components, the blood pressure records obtained at widely different recorder chart speeds, and when the dogs were administered a blood pressure elevating drug, were substantially indistinguishable. Other test experience accumulated on human beings, wherein blood pressure was measured through the skin layer overlying the blood vessels in test, as distinguished from application of the sensing head direct to the blood vessel wall, showed that the overlying skin had no inhibitory effect whatever on the measurements.

The design of apparatus of FIGS. 1 and 2 is entirely effective as a body fluid pressure measuring device, and is preferred because of its simplicity of construction. However, other designs utilizing rigid, pressure-deflectible feet interposed between the subject's skin or elastic body membrane containing body fluid and the discharge opening 15 of the gas pressure development nozzle 14 are equally operable. One such design is that of FIG. 7, wherein elements corresponding in function to those of FIGS. 1 and 2 are given the same reference numeral designation. Here gas pressure development nozzle 14 is terminated well back of face 16 to provide space for the free oscillatory movement of pressure-deflectible foot 55 responsive to body fluid pressure applied to its underside. Preferably, foot 55 can simply be a unitary disk machined to a smaller diameter on the side confronting depressor element 11, permitting it to slide easily within aperture 17 without binding around the periphery, while being restrained from escape through the aperture by the provision of a diameter at the top exceeding the aperture opening. Here the applicable annular width dimension $a$ is that measured from the periphery of aperture 17, which in this instance is a straight bore in contrast with beveled, to the smaller diameter periphery of foot 55, whereas dimension $b$ is the clearance between the top surface of foot 55 and discharge opening 15. These dimensions possess the same critical limits as hereinbefore described for the embodiment of FIGS. 1 and 2. If desired, foot 55 can be adhered on its underside to the back side of diaphragm 24, or it can be slidably suspended on pins depending from the lower edge of nozzle 14 or its surrounding integral structure, or, in fact, foot 55 can be rested freely in position without restraining mountings of any kind, whereupon it will be retained in position solely by its close proximity to opening 15 on the top and to depressor element 11 on the bottom. A free-mounted foot 55 is unrestrained laterally, so that dimension $a$ varies along different radii drawn from the center of foot 55; however, this is of little consequence, since the open annular area between foot 55 and aperture 17 remains constant.

Pressurized air is again introduced through a gas supply port 22 provided with a restricting orifice 22a, in this design disposed in prolongation with nozzle 14, while the developed pressure reading take off is via port 23 in the same manner as previously described for the embodiment of FIGS. 1 and 2.

Operation of this embodiment is the same as that hereinbefore described for the embodiment of FIGS. 1 and 2, involving as it does, discharge of gas from nozzle 14 via opening 15, with exhaust to the atmosphere through vent 21 and measurement of the gas pressure developed within nozzle 14 as a function of body fluid pressure.

There is some advantage by way of improved gas throttling action, particularly with freely mounted feet 55, in forming the face of the foot in confrontation with nozzle 14 with a guiding profile adapted to actually enter into opening 15, and a number of such variations are shown in FIGS. 7a–7d, these being, in order: FIG. 7a conical integral face, FIG. 7b spherical integral face, FIG. 7c separate cooperating sphere and plate combination, with the plate constituting the foot 55 adjacent depressor element 11, and FIG. 7d paraboloidal integral face. With these modifications critical dimension $a$ is identical with that hereinbefore described; however, $b$ is now the vertical dimension measured from the plane transverse the foot protuberance at the diameter equal to that of discharge opening 15 to the plane of opening 15, as represented schematically for FIG. 7a.

Yet another embodiment of the invention, which permits the use of an offset pressure development nozzle 14, is that shown in FIGS. 8 and 9. Here gas escape from opening 15 of nozzle 14 is throttled by a pressure-deflectible foot 55 pivoted for free rotation about a pin 56, carried by depressor element 11, responsive to body fluid pressure exerted against the lower side of foot 55.

In this design the rear side of foot 55 is extended, as at 55', to constitute an integral flapper opposed to nozzle opening 15 and, preferably, a conical throttling protuberance 55" is provided in confrontation with the nozzle to more precisely throttle gas flow out of opening 15 in much the same manner as hereinbefore taught for the embodiments of FIGS. 7a–7d. Dimension $a$ is as previously described, whereas $b$ is the clearance between the face of 55' carrying protuberance 55" and discharge opening 15 where the base of protuberance 55" is smaller in diameter than the diameter of opening 15, or between the transverse plane of protuberance 55" taken at the diameter equal to the diameter of opening 15 measured to opening 15 where protuberance 55" is larger in diameter than opening 15.

While a circular aperture 17 in depressor element 11 is preferred because of ease of fabrication, particularly in the precise dimensions required for the uses contemplated, other aperture shapes can be employed, so long as the necessary constraint of body tissue described in connection with FIG. 2 is obtained. Thus, for the embodiment of FIGS. 8 and 9, a rectangular cross-section aperture 17 is utilized, and other designs can successfully employ triangular, square and various other aperture shapes.

It is practicable to use a sensing head having a perfectly flat depressing face 16 in most instances, especially where blood pressure is the measurement sought and where relatively small-dimensioned sensing heads are employed. However, broadly, all of the advantages of this invention are obtainable with designs of sensing heads wherein the membrane-depressing face is provided with a surface generally conforming to that of the undepressed flesh to which the depressor element is applied during a measurement. Thus, for tonometers measuring the fluid pressure existing within the eyeball, it is preferred to use a relatively large-sized head 10 having a depressing face covering a relatively large area of the eyeball and, in this case, a concave face 16 conforming generally to the undepressed eyeball surface is preferred.

It will be understood that any gas can be employed as the pressure medium for the apparatus of this invention, although, normally, atmospheric air is the most convenient choice. As previously mentioned the utilization of gas contact-isolating diaphragms 24 is preferred as a routine sterile measure, and thus the gas supply is prevented from contaminating the wound where the blood vessel is laid open to direct instrument contact, and also from drying the body tissue to an objectionable degree. However, diaphragms 24 can be dispensed with if desired, and the designs of apparatus detailed in FIGS. 7, 8 and 9 largely obviate problems arising out of extensive gas contact with the test site due to the shielding action automatically afforded by the interposed pressure feet 55.

The pressure sensing head of this invention is applicable to any blood vessels which are located near the surface, and utilization is not limited solely to the most external vessels, such as the common radial and temporal artery sites. While A.-C. operation is often preferred in the electrical signal generation, D.-C. is also satisfactory. For body fluid pressure measurements other than blood pressure, such as the pressure development associated with glaucoma, for example, much lower significant pressure levels can pertain, which necessitates the use of sensitive, low-noise electrical auxiliaries in such uses, and this accommodation is well within the skill of the art.

From the foregoing, it will be apparent that the apparatus of this invention can be modified in numerous respects without departure from the essential spirit of the invention, and it is intended to be limited only by the scope of the appended claims.

What is claimed is:

1. A pressure sensing head for the measurement of physiologic fluid pressure existing behind an elastic body membrane comprising, in combination, a rigid apertured elastic body membrane depressor element provided with an elastic body membrane-depressing face having a surface generally conforming to that of the undepressed flesh to which said depressor element is to be applied, and a gas pressure development nozzle fixedly mounted with respect to said depressor element with discharge opening disposed on the rear side of said depressor element from said elastic body membrane-depressing face in a location preserving throttled gas flow out of said discharge opening responsive to said physiologic fluid pressure but clear of contact with said elastic body membrane and any flesh overlying said elastic body membrane as well as any elastomeric diaphragm closing off the aperture in said depressor element and any freely movable rigid structure interposed between said discharge opening and said elastic body membrane together with any said flesh overlying said elastic body membrane during the time said depressor element is made to depress said elastic body membrane without occlusion of passage of physiologic fluid therepast, said gas pressure development nozzle being provided with a first port for introduction therein of gas under pressure at substantially fixed flow rate and a second port for measurement of the gas pressure developed within said nozzle, whereupon said gas pressure developed within said nozzle is a function of said physiologic fluid pressure existing behind said elastic body membrane.

2. A pressure sensing head for the measurement of physiologic fluid pressure existing behind an elastic body membrane comprising, in combination, a rigid apertured elastic body membrane depressor element provided with an elastic body membrane-depressing face having a surface generally conforming to that of the undepressed flesh to which said depressor element is to be applied, and a gas pressure development nozzle fixedly mounted with respect to said depressor element with discharge opening disposed central of the aperture in said depressor element on the rear side of said depressor element from said elastic body membrane-depressing face in a plane substantially coparallel with said face but retracted inwardly therefrom a slight distance defining a 360° gas escape passage out of said nozzle during the time said depressor element is made to depress said elastic body membrane without occlusion of passage of physiologic fluid therepast, said gas pressure development nozzle being provided with a first port for introduction therein of gas under pressure at substantially fixed flow rate and a second port for measurement of the gas pressure developed within said nozzle, whereupon said gas pressure developed within said nozzle is a function of said physiologic fluid pressure existing behind said elastic body membrane.

3. A pressure sensing head for the measurement of physiologic fluid pressure existing behind an elastic body membrane according to claim 1 wherein the aperture in said depressor element is closed off on the side of said elastic body membrane-depressing face of said depressor element with a thin taut, but substantially unstressed, elastomeric diaphragm.

4. A pressure sensing head for the measurement of physiologic fluid pressure existing behind an elastic body membrane comprising, in combination, a rigid apertured elastic body membrane depressor element provided with an elastic body membrane depressing face having a surface generally conforming to that of the undepressed flesh to which said depressor element is to be applied, and a gas pressure development nozzle provided with a first port for introduction therein of gas under pressure at substantially fixed flow rate and a second port for measurement of the gas pressure developed within said nozzle fixedly mounted with respect to said depressor element with discharge opening disposed on the rear side of said depressor element from said elastic body membrane-depressing face a sufficient distance to accommodate in freely slidable relationship within the aperture in said depressor element a rigid pressure-deflectible foot movable responsive to said physiologic fluid pressure existing within said elastic body membrane throttling gas flow out of said gas pressure development nozzle to thereby render said gas pressure developed within said nozzle a function of said physiologic fluid pressure existing when said depressor element is made to depress said elastic body membrane without occlusion of physiologic fluid passage therepast.

5. A pressure sensing head for the measurement of blood pressure comprising, in combination, a rigid flat apertured blood vessel depressor element wherein the aperture thereof is of a size lying well within the projected limits of the blood vessel in depressed state within which the blood pressure is to be measured, and a gas pressure development nozzle fixedly mounted with respect to said depressor element with discharge opening disposed on the rear side of said depressor element from the blood vessel-depressing face in a location preserving throttled gas flow out of said discharge opening responsive to said blood pressure but clear of contact with said blood vessel and any flesh overlying said blood vessel as well as any elastomeric diaphragm closing off said aperture in said depressor element and any freely movable rigid structure interposed between said discharge opening and said blood vessel together with any said body tissue overlying said blood vessel during the time said depressor element is made to depress said blood vessel without occlusion of passage of blood therethrough, said gas pressure development nozzle being provided with a first port for introduction therein of gas under pressure at substantially fixed flow rate and a second port for measurement of the gas pressure developed within said nozzle, whereupon said gas pressure developed within said nozzle is a function of the blood pressure within said blood vessel.

References Cited in the file of this patent

UNITED STATES PATENTS

| | | |
|---|---|---|
| 2,478,372 | Colegrave | Aug. 9, 1949 |
| 2,699,465 | Hamilton | Jan. 11, 1955 |
| 3,032,030 | Han | May 1, 1962 |
| 3,049,001 | MacKay | Aug. 14, 1962 |